United States Patent
Aso et al.

(10) Patent No.: US 7,864,486 B2
(45) Date of Patent: Jan. 4, 2011

(54) HARD DISC APPARATUS AND HEAD ALIGNMENT METHOD

(75) Inventors: Yuma Aso, Ome (JP); Yasuhiko Ichikawa, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/362,274

(22) Filed: Jan. 29, 2009

(65) Prior Publication Data

US 2009/0195917 A1    Aug. 6, 2009

(30) Foreign Application Priority Data

Jan. 31, 2008    (JP) .............................. 2008-021903

(51) Int. Cl.
*G11B 5/596*    (2006.01)
(52) U.S. Cl. .................................. 360/77.08
(58) Field of Classification Search ............. 360/77.08, 360/75, 78.08, 77.01, 60, 48, 77.04, 53, 51, 360/78.14; 711/154
See application file for complete search history.

(56) References Cited

U.S. PATENT DOCUMENTS

| | | | | |
|---|---|---|---|---|
| 5,589,998 A * | 12/1996 | Yu | .......................... | 360/78.14 |
| 5,715,105 A * | 2/1998 | Katayama et al. | .............. | 360/48 |
| 5,796,543 A * | 8/1998 | Ton-That | .................. | 360/77.08 |
| 5,802,584 A * | 9/1998 | Kool et al. | ................... | 711/154 |
| 5,818,654 A * | 10/1998 | Reddy et al. | .................. | 360/53 |
| 6,078,452 A * | 6/2000 | Kittilson et al. | ............... | 360/51 |
| 6,084,739 A * | 7/2000 | Assouad | .................. | 360/77.08 |
| 6,108,158 A * | 8/2000 | Katayama et al. | ........ | 360/77.04 |
| 6,236,528 B1 * | 5/2001 | Katayama et al. | ........ | 360/77.04 |
| 6,400,523 B1 * | 6/2002 | Katayama et al. | ........ | 360/77.04 |
| 6,456,451 B1 * | 9/2002 | Asano et al. | .............. | 360/77.04 |
| 6,995,940 B2 * | 2/2006 | Ehrlich | ........................ | 360/75 |
| 7,106,548 B2 * | 9/2006 | Ehrlich | ..................... | 360/77.04 |
| 7,336,438 B2 * | 2/2008 | Park et al. | ................ | 360/77.08 |
| 7,405,899 B2 * | 7/2008 | Ryu et al. | ................ | 360/77.08 |
| 7,529,059 B2 * | 5/2009 | Ryu et al. | ................ | 360/77.08 |
| 7,542,229 B2 * | 6/2009 | Yasui et al. | ................... | 360/75 |

(Continued)

FOREIGN PATENT DOCUMENTS

JP    H03-168978 A    7/1991

(Continued)

OTHER PUBLICATIONS

Explanation of Non-English Language References.

(Continued)

*Primary Examiner*—Fred Tzeng
(74) *Attorney, Agent, or Firm*—Knobbe, Martens, Olson & Bear LLP

(57) ABSTRACT

According to one embodiment, a hard disc apparatus comprises a disc, wherein areas between neighboring servo areas are allocated to data areas including data sectors, a head module, and a storage module configured to store head alignment data, wherein the head alignment data are defined for the data areas, and includes information indicating an interval from the servo area to a first data sector, information indicating a data area in one track, a first data sector which is a start sector of the track, and information indicating the presence/absence of a defective sector including a primary defect, and the start sector of a track including the defective sector is a data sector next to the defective sector.

10 Claims, 4 Drawing Sheets

U.S. PATENT DOCUMENTS

| | | | |
|---|---|---|---|
| 7,602,576 B2 * | 10/2009 | Yoshida | 360/77.01 |
| 2005/0141126 A1 * | 6/2005 | Ehrlich et al. | 360/75 |
| 2005/0237648 A1 * | 10/2005 | Ehrlich | 360/60 |

FOREIGN PATENT DOCUMENTS

| | | |
|---|---|---|
| JP | 03-259460 | 11/1991 |
| JP | H04-146573 A | 5/1992 |
| JP | 07-45004 | 2/1995 |
| JP | 08-273162 | 10/1996 |
| JP | 2005-25892 | 1/2005 |

OTHER PUBLICATIONS

Notice of Reasons for Rejection mailed by Japan Patent Office on Jun. 16, 2009 in the corresponding Japanese patent application No. 2008-021903.

* cited by examiner

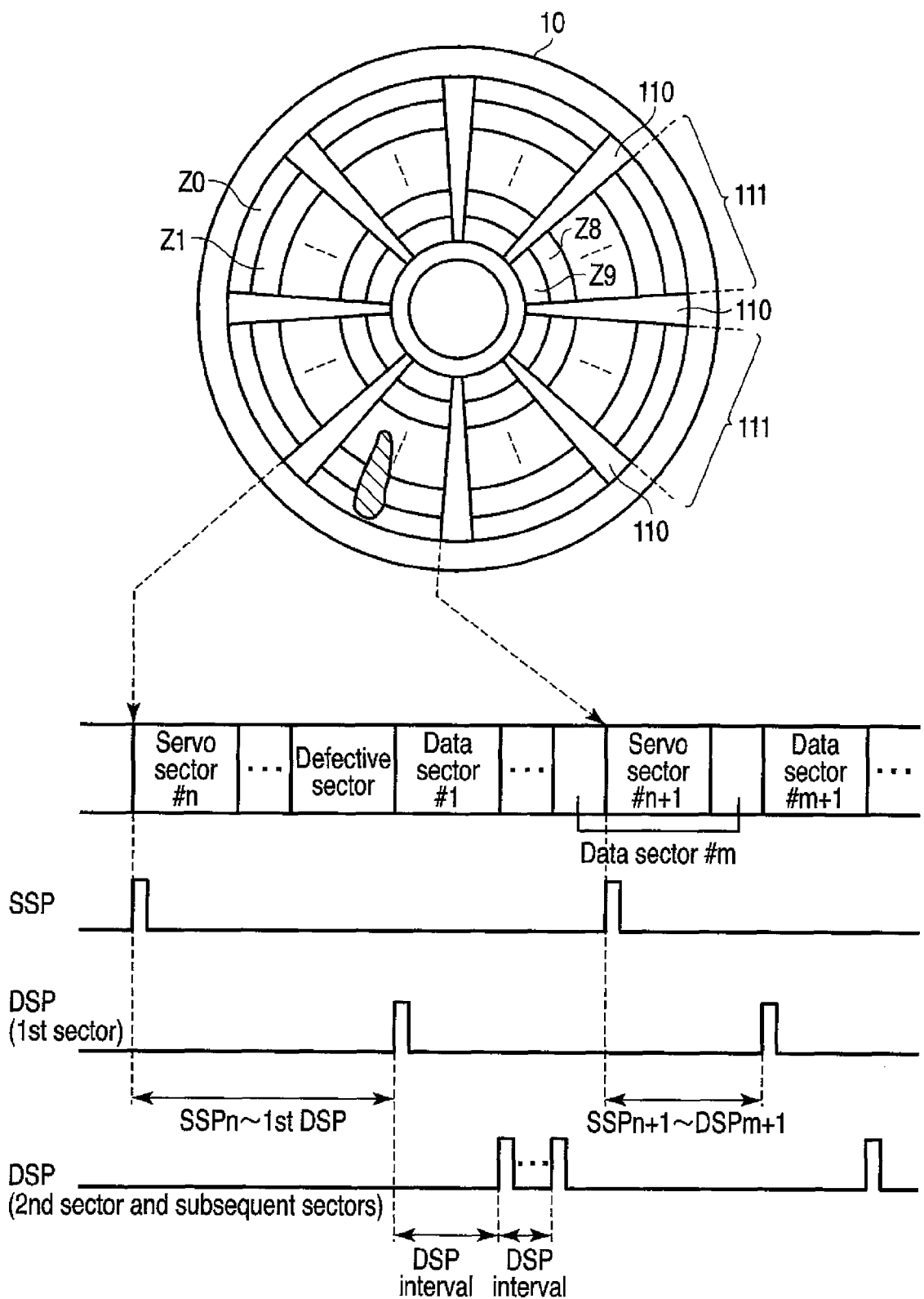
F I G. 2

| Zone #<br>Servo sector # | Start sector flag | (SSP-1st DSP) time | Sector length (DSP interval) | Number of sectors | Split flag |
|---|---|---|---|---|---|
| Zone 1<br>Servo sector 1 | Off | *** | *** | *** | Off |
| Zone 1<br>Servo sector 2 | Off | *** | *** | *** | Off |
|  |  |  |  |  |  |
| Zone i<br>Servo sector n | On | *** | *** | *** | On |
| Zone i<br>Servo sector n+1 | Off | *** | *** | *** | On |
|  |  |  |  |  |  |

FIG. 3

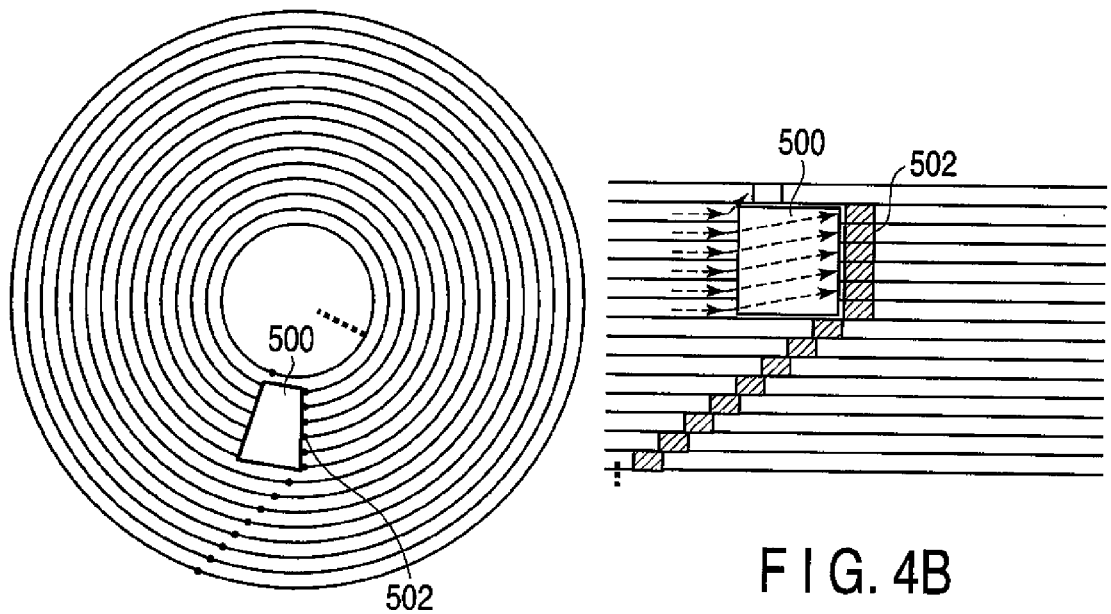
FIG. 4B
FIG. 4A
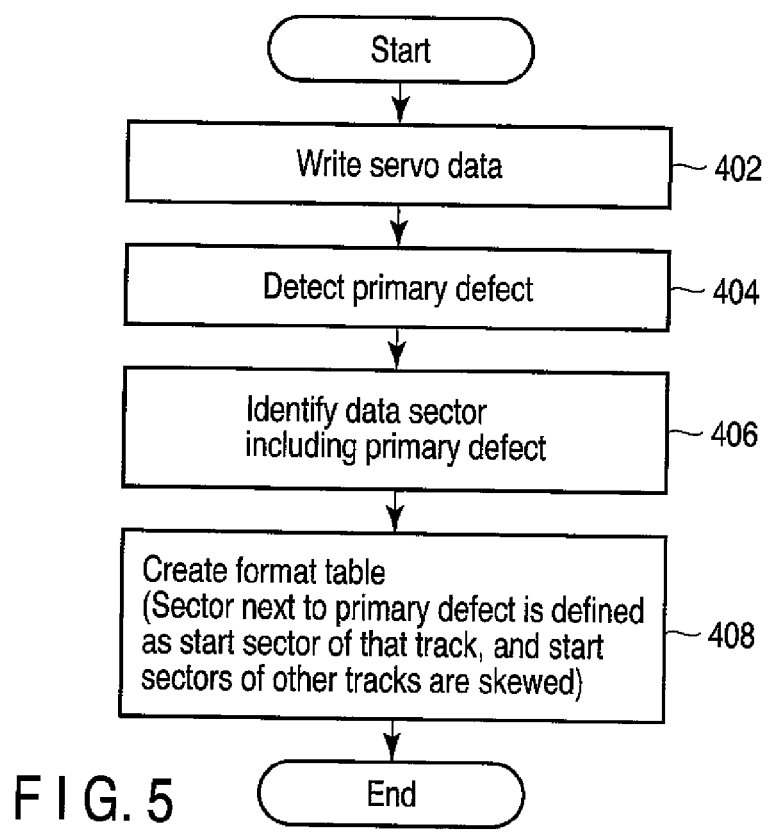
FIG. 5

HARD DISC APPARATUS AND HEAD ALIGNMENT METHOD

CROSS-REFERENCE TO RELATED APPLICATIONS

This application is based upon and claims the benefit of priority from Japanese Patent Application No. 2008-021903, filed Jan. 31, 2008, the entire contents of which are incorporated herein by reference.

BACKGROUND

1. Field

One embodiment of the invention relates to a hard disc apparatus and head alignment method.

2. Description of the Related Art

A conventional hard disc apparatus adopts a track/head skew method. Upon completion of access to sectors on one track, a head is moved to the next track. In this case, the head is moved to a neighboring track on the same recording medium or to a track on a different recording medium having the same cylinder number. In consideration of a time required for this movement, sector positions on neighboring tracks are skewed.

For example, in Jpn. Pat. Appln. KOKAI Publication No. 4-146573 (from the 13th line of the lower left column to the 5th line of the lower right column, page 2, FIG. 3), a format map is created by reading a defect list recorded on a medium to obtain a defective sector in that track, and assigning sector numbers while skipping the defective sector. Next, a track skew value is set to be a value obtained by adding the number of sectors required for head switching and the number of alternate sectors used in the previous track, and subtracting the number of alternate sectors per track from the sum, and formatting is done to have, as the first sector, a position by skewing a sector position behind the first sector of the previous track by the track skew value. In this way, a track skew method that can minimize a disc rotation waiting time upon making a read or write access across tracks is provided.

On the other hand, defect processing which substitutes sectors not suited to read/write accesses due to a defect such as a scratch on the recording surface of a disc using a reserved area prepared in advance is executed. As an example of the defect processing, skip processing is known. In this processing, unrecordable sectors formed at the time of manufacture are registered in a primary defect list, and defective sectors registered in the primary defect list are skipped without being used upon recording of actual data. During this skip period, the head cannot access any sector. In the above patent publication, since the track skew is done, when the head continuously and sequentially accesses from a certain track to a neighboring track, a track moving time for the track skew is required. For this reason, when the skip processing is executed due to the presence of a defect, the time in which the head cannot access any sector is increased to the total of the skip time and track moving time.

As described above, in the conventional hard disc apparatus, when the skip processing for skipping a defect on the disc recording surface without using it upon recording data is executed, the total time of the skip time and the track moving time is a time in which the head cannot access any sector, and the data transfer rate and, especially, the disc transfer rate drop, thus deteriorating performance.

SUMMARY

A hard disc apparatus is presented. In some embodiments, the hard disc apparatus comprises a disc. The disc comprises a plurality of servo areas and a plurality of data areas. The servo areas are situated between the data areas, and at least one data area comprises a plurality of tracks. At least one track comprises a plurality of data sectors. The hard disc apparatus further comprises a head configured to read and write information from and on the disc. The hard disc apparatus further comprises a storage module configured to store head alignment data for the at least one data area. The head alignment data comprises information indicating the location of a start sector for the at least one track. The head alignment data further comprises information indicating whether the at least one track contains a defective sector. The start sector of a track that contains a defective sector is located next to the defective sector.

An alignment method of a head is presented. In some embodiments, the head is configured to read and write information from and on a disc. The disc comprises a plurality of servo areas and a plurality of data areas. At least one data area comprises a plurality of tracks. At least one track comprises a plurality of data sectors. The alignment method of the head comprises detecting a primary defect. The alignment method of the head further comprises identifying at least one defective sector based on the primary defect. The alignment method of the head further comprises creating a format table. The format table comprises, for the at least one data area, information indicating the location of a start sector for the at least one track. The format table further comprises information indicating whether the at least one track contains a defective sector. The start sector of a track that contains a defective sector is located next to the defective sector.

An alignment method of a head is presented. In some embodiments, the head is configured to read and write information from and on a disc. The disc comprises a plurality of servo areas and a plurality of data areas. At least one data area comprises a plurality of tracks. At least one track comprises a plurality of data sectors. The alignment method of the head comprises referring to a format table. The format table comprises, for the at least one data area, information indicating the location of a start sector for the at least one track. The format table further comprises information indicating whether the at least one track contains a defective sector. The start sector of a track that contains a defective sector is located next to the defective sector. The alignment method of the head further comprises controlling a head to skip at least one defective sector and to move to a start sector of an adjacent inner track when the head reaches a defective sector.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary view showing the data format of a disc;

FIG. 3 is an exemplary view showing the contents of a format table;

FIGS. 4A and 4B are exemplary views showing the start tracks and skews of the formatted disc; and FIG. 5 is an exemplary flowchart showing the format operation.

DETAILED DESCRIPTION

Figure 1:
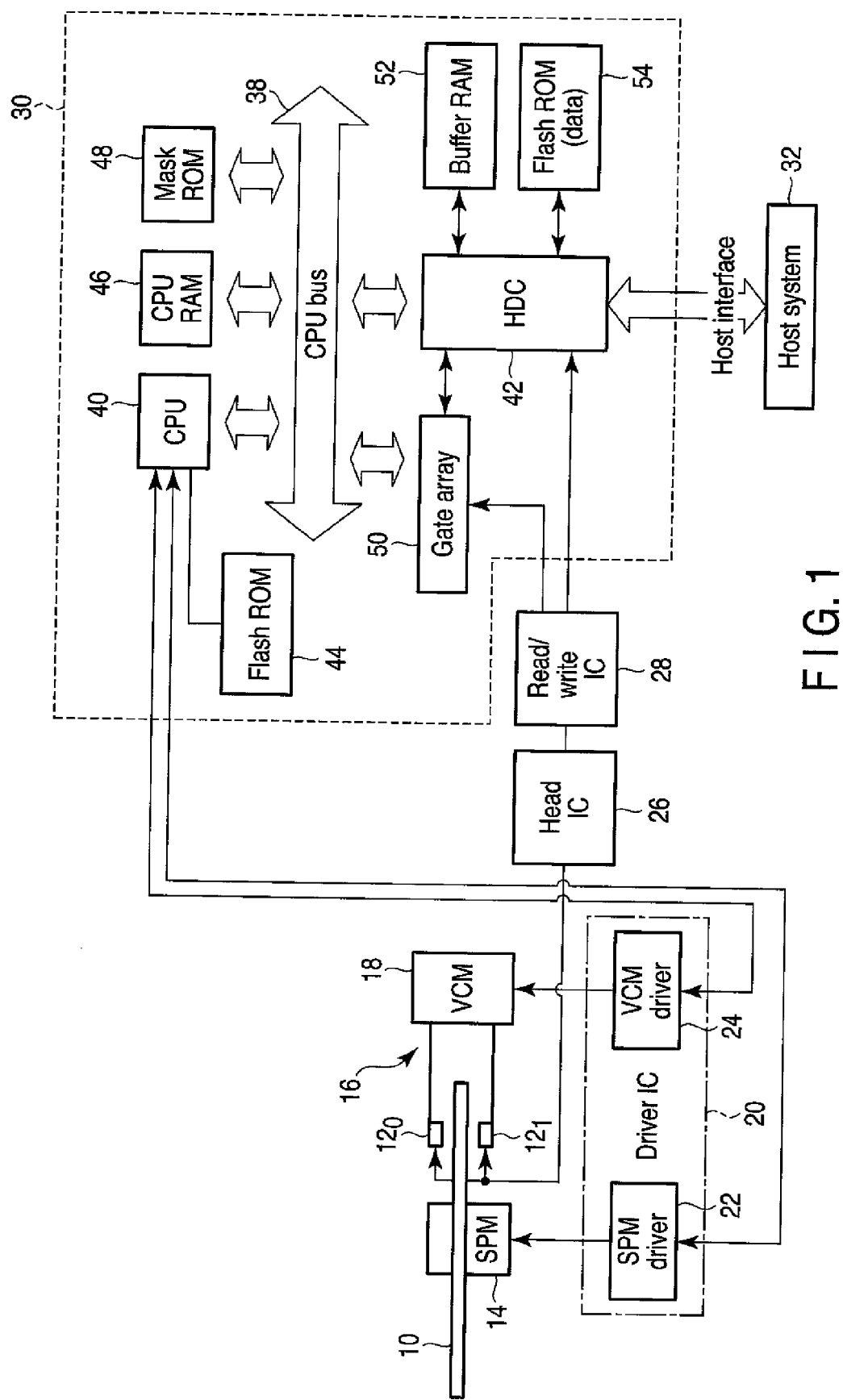
FIG. 1 is an exemplary block diagram showing the overall arrangement of a hard disc apparatus according to one embodiment of the invention.

Various embodiments according to the invention will be described hereinafter with reference to the accompanying drawings. In general, according to one embodiment of the invention, a hard disc apparatus comprises a disc for recording servo data, wherein areas between neighboring servo areas are allocated to data areas including data sectors; a head module configured to read and write information from and on the disc; and a storage module configured to store head alignment data, the head alignment data are defined for the data areas, and configured to comprise information indicating an interval from the servo area to a first data sector, information indicating a data area in one track, a first data sector which is a start sector of the track, and information indicating a presence/absence of a defective sector including a primary defect, and the start sector of a track including the defective sector is a data sector next to the defective sector.

According to an embodiment, FIG. 1 is a block diagram showing the arrangement of a hard disc apparatus according to the first embodiment of the invention. A magnetic disc 10 has two, upper and lower disc surfaces. At least one disc surface, for example, both the disc surfaces of the two disc surfaces of the magnetic disc 10 form recording surfaces on which data is magnetically recorded. Magnetic heads $12_0$ and $12_1$ are allocated in correspondence with the respective recording surfaces of the magnetic disc 10. In the arrangement shown in FIG. 1, the apparatus which comprises the single magnetic disc 10 is assumed. However, an apparatus in which a plurality of magnetic discs 10 are stacked may be used.

As each magnetic head $12i$ (i=0 and 1), a composite magnetic head prepared by separately mounting a read head and write head on a slider (not shown) is adopted. The read head comprises a magnetoresistance element (MR element or GMR element). The write head comprises a single magnetic pole type inductive thin film head.

The magnetic disc 10 is rotated at a high speed by a spindle motor (to be abbreviated as an SPM hereinafter) 14. Each magnetic head $12i$ is attached to an actuator (carriage) 16. The magnetic head $12i$ is moved in the radial direction of the magnetic disc 10 according to a pivotal motion of the actuator 16. As a result, the magnetic head $12i$ is aligned on a target track. The actuator 16 has a voice coil motor (to be abbreviated as a VCM hereinafter) 18 which serves as a drive source of the actuator 16. The actuator 16 is driven by the VCM 18. The SPM 14 and VCM 18 are driven by drive currents (SPM current and VCM current) respectively supplied from a driver IC (Integrated Circuit) 20. The driver IC 20 includes an SPM driver 22 and VCM driver 24. The SPM driver 22 supplies an SPM current of an amount designated by a CPU 40 to the SPM 14. The VCM driver 24 supplies a VCM current of an amount designated by the CPU 40 to the VCM 18.

Each magnetic head $12i$ is connected to a head IC (head amplifier circuit) 26. The head IC 26 has a read amplifier which amplifies a read signal output from the read head, and a write amplifier which converts a write data signal into a write current signal, and is connected to a read/write IC (read/write channel) 28. The read/write IC 28 is a signal processing device which executes various signal processes, and is roughly classified into a servo block which executes signal processing required for alignment processing of each magnetic head $12i$, and a read/write block which executes signal processing for reading and writing data. The signal processing of the read/write IC 28 includes processing for analog-to-digital converting a read signal, processing for encoding write data, and processing for decoding digital read data. The read/write IC 28 is connected to a control device 30. The read/write IC 28 includes a function of generating a servo sector pulse SSP from servo data (to be described later).

The control device 30 includes the CPU 40, which time-divisionally executes control of the overall control device 30 and that of the driver IC 20. To a CPU bus 38, a mask ROM 48 which records a program (initial load program) required for the CPU 40 to copy firmware for device control from a flash ROM 44 to a CPU RAM 46 upon power ON, the CPU RAM 46 for storing programs that implement device control, variables, and the like, a disc controller (to be abbreviated as an HDC hereinafter) 42, and a gate array 50 for generating various signals required for control are connected.

Control registers for the HDC 42 and gate array 50 are assigned to a part of a memory space of the CPU 40, and the CPU 40 controls the HDC 42 and gate array 50 by making read and write accesses with respect to this area.

The HDC 42 is connected to the gate array 50, a buffer RAM 52, and the read/write IC 28 in addition to the CPU bus 38. Although not shown, the HDC 42 is divided into respective functions. For example, the HDC 42 is divided into a host block which executes interface control between the control device 30 and a host system 32, a buffer block which controls the buffer RAM 52, a read/write block which is connected to the read/write IC 28 and gate array 50 and executes read/write processing, and the like.

The read/write block receives the servo sector pulse SSP, which is generated by the read/write IC 28 based on the servo data signal, generates a data sector pulse with reference to a data sector pulse (DSP) table stored in the gate array 50 after an elapse of a predetermined delay time, and supplies the pulse to the read/write IC 28.

FIG. 2 shows the format of the magnetic disc 10. A recording format called CDR (constant density recording) is applied to the magnetic disc 10. Each recording surface of the magnetic disc 10 to which this CDR format is applied is managed while being divided into a plurality of zones in the radial direction of the magnetic disc 10. In the example of FIG. 2, assume that each recording surface of the magnetic disc 10 is managed while being divided into 10 zones Z0 to Z9. The number of data sectors (to be simply referred to as sectors hereinafter) per track (cylinder) of each zone Zj (j=0, 1, ... 9) is set to be larger toward the outer peripheral side of the magnetic disc 10. This is because the format efficiency of the magnetic disc 10 improves by effectively using areas on the outer peripheral side of the magnetic disc 10 with larger physical perimeter lengths of tracks (cylinders). For this reason, the data transfer speed upon reading out data from the magnetic disc 10 or upon writing data on the magnetic disc 10 becomes higher toward the outer peripheral side of the magnetic disc 10.

On each recording surface of the magnetic disc 10, a plurality of servo areas 110 are allocated discretely at equal angular intervals in the circumferential direction of the magnetic disc 10 and radially in the radial direction of the magnetic disc 10. On each servo area 110, servo data for alignment is recorded. The servo data includes position information required to align each head $12i$ in a target range on a target track on the magnetic disc 10. Of each recording surface of the magnetic disc 10, data areas 111 for recording data transferred from a host system are allocated between neighboring servo areas 110. For this reason, the servo areas 110 and data areas 111 are alternately allocated at equal angular intervals on the magnetic disc 10. A large number of concentric data tracks (not shown) are allocated on each recording surface of the magnetic disc 10 to have the rotation axis as the center. A plurality of data sectors are assigned for each track on the data areas 111, and servo sectors are assigned to the servo areas 110.

The length of each data area 111 (that in the circumferential direction of the disc 10) is not always an integer multiple of the length of each data sector. For this reason, one data sector #m is often separated into two sectors to sandwich a servo sector #n+1 between them, as shown in FIG. 2. The separated sectors are called split sectors. The data format of the split sectors is the same as that of a normal sector except that the size of user data is different.

Alignment for controlling each magnetic head 12$i$ to trace a track is executed based on information obtained from the servo data signal. More specifically, upon execution of alignment of each magnetic head 12$i$, an analog signal, which is read out by the magnetic head 12$i$ and is amplified by the head IC 26, is sent to the read/write IC 28, and is extracted as servo data by the servo block of the read/write IC 28. After the servo data is extracted, the servo sector pulse SSP indicating that the head has reached a predetermined position on the servo area is generated, and is supplied to the HDC 42. The HDC 42 generates the data sector pulse DSP indicating that the head has reached the first data sector after an elapse of a predetermined period of time from that servo sector pulse SSP, generates a read gate pulse or write gate pulse (not shown) after an elapse of another predetermined period of time from the DSP, and supplies the generated pulse to the read/write IC 28. The read/write IC 28 executes a read or write operation at the timing of the read gate pulse or write gate pulse. A time period from the SSP to the DSP and that from the DSP to the read gate pulse or write gate pulse are described in a format table stored in the gate array 50. The servo data is further processed by the gate array 50, and the CPU 40 controls the driver IC 20 based on this data to supply a current for alignment of the magnetic head 12$i$ to the VCM 18.

In the manufacture of the magnetic disc 10, a planar scratch or defect (primary defect) over a plurality of tracks is often generated on each disc surface. Defect processing for skipping a sector including the defect without using it in read and write processes is executed. Assume that it is detected as a result of checking before delivery that a primary defect is generated on a data area (a data area that follows a servo sector #n) between the servo sectors #n and #n+1.

The data area between the servo sectors is divided into a plurality of data sectors, which are assigned data sector numbers like data sectors #1, #2, . . . for each data area. One track includes first data sectors #1 as many as the number of servo sectors. Of these first data sectors, the first sector of the data area between the first and second servo sectors #1 and #2 is normally defined as the start sector of the track. When the track skew method is adopted, the start sector is determined for a certain track, as described above, and the start sector of a neighboring track is sequentially skewed.

By contrast, in this embodiment, the start sector of each track is determined in consideration of the position of the primary defect. As shown in FIG. 2, a data sector which is accessed by the head next to a defective sector due to the primary defect is defined as the start sector of a track. More specifically, the start sector of a track is a sector next to the defective sector on the data area between the servo sectors #n and #n+1. Even when the track skew method is adopted, the start sector of the track including the primary defect is not skewed. However, since a sector next to the defective sector has deviated from the position of the normal start sector, it may be considered that the track skew method (the skew amount is fixed) is adopted.

The position of the start sector is determined by determining an interval from the servo sector pulse SSP to the first data sector pulse DSP and determining the data area, the first data sector #1 of which is used as the track start sector.

More specifically, the position of the start sector is determined based on a format table shown in FIG. 3. The format table is stored in the gate array 50, and stores information indicating a DSP allocation, i.e., assignment information of a sector format for each data area 111 between the neighboring servo areas 110 in each zone for respective zones Zj (j=0, 1, . . . 9) of the disc 10. The assignment information includes a start sector flag indicating whether or not that data area includes a track start sector, an interval from the servo sector pulse to the first data sector pulse, the sector length and the number of sectors in that data area, and a split flag indicating the presence/absence of split sectors. The first sector, second sector, . . . exist in every data areas, and the first sector of the data area in which the start sector flag is ON of these data areas is the track start sector.

Note that the primary defect may have an arbitrary shape. For this reason, when a sector next to a defective sector is defined as a start sector for each track, the positions of the start sectors may become uneven along the shape of the defect. In order to prevent this, the format table is described to align the positions of the start sectors of a plurality of tracks including the primary defect to that of the first sector farthest from the servo sector.

If there are a plurality of primary defects, the format table is described to define a sector next to the primary defect having a maximum size in the track direction as the start sector of a track.

The start sectors of tracks free from any primary defect are sequentially skewed for respective tracks by track skewing. FIGS. 4A and 4B show the positions of the start sectors. FIG. 4B is a partial enlarged view of FIG. 4A. The start sector of each track is skewed behind that of an outer track toward the inner periphery of the disc in the traveling direction of the head.

As described above, since a sector next to a defective sector due to the defect is defined as a start sector for each of tracks including the primary defect, when the head reaches the defective sector during continuous access of the disc, it skips a defective sector 500, and moves to a start sector 502 of the next (inner) track, as indicated by each broken line in FIG. 4B. Since the skip processing of a defective sector and track movement of the head can be performed at the same time, a time in which the head cannot access any sector is "defect skip time+head moving time" in the conventional apparatus, while it is "defect skip time (which includes head moving time)" in this embodiment, thus increasing the transfer rate.

FIG. 5 is a flowchart showing the format operation before delivery of a disc. In block 402, servo data are written in servo sectors. Each servo data includes track data in which a track number is written, sector data in which a sector number is written, and a burst signal.

In block 404, a write/read test is applied to each data sector to determine whether or not a defect (primary defect) exists on the disc surface, If the existence of a defect is detected, data sectors where the primary defect exists are detected in block 406 and are defined as detective sectors.

In block 408, the format table shown in FIG. 3 is created. That is, for each data area 111 between the neighboring servo areas 110 in each zone for respective zones Zj (j=0, 1, . . . 9) of the disc 10, a start sector flag indicating whether or not that data area includes a track start sector, an interval from the servo sector pulse to the first data sector pulse, the sector length and the number of sectors in that data area, and a split flag indicating the presence/absence of split sectors are described. The start sector flag of each data area including the defective sector is set ON. The start sector flags of other data areas are OFF.

As described above, according to the first embodiment, when a planar primary defect involving more than one tracks is generated in the manufacture of a disc, the format table is created so as to define a sector located after the rearmost end of the defect in each track as the start sector of that track. In this manner, while the head skips the defective sector during sequential access, the head can be moved to the next track, thus increasing the data transfer rate and, especially, the disc transfer rate, and improving the performance.

Since a data sector next to the primary defect associated with the plurality of tracks is set as a start data sector of each track, when a defective sector including the primary defect is detected during continuous access to a disc, the skip processing of that data sector is executed, and the movement of the head to the start data sector of the neighboring track can be completed during the skip period. Therefore, a time in which the head cannot access any sector is only the skip time, and the data transfer rate and, especially, the disk transfer rate can be increased, thus improving the performance.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, in the above description, as for data sectors, the first data sector, second data sector, . . . are defined for each data area. However, the first data sector, second data sector, . . . may be defined for each track in place of the data area. In this case, since the first data sector is the start sector of each track, the start sector flag in the format table shown in FIG. 3 may be omitted. The start sectors of tracks free from any primary defect are skewed. However, these start sectors need not always be skewed. Furthermore, the positions of the start sectors of tracks including the primary defect are aligned to that of the first sector farthest from the servo sector, but they need not always be aligned. If the length of the primary defect in the track direction is very short, track movement of the head may not be completed during the skip period. In this case, the start sectors may be skewed in consideration of the track moving time.

What is claimed is:

1. A hard disc apparatus comprising:
    a disc comprising a plurality of servo areas and a plurality of data areas, the servo areas being situated between the data areas, at least one data area comprising a plurality of tracks, at least one track comprising a plurality of data sectors;
    a head configured to read and write information from and on the disc; and
    a storage module configured to store head alignment data for the at least one data area, the head alignment data comprising information indicating the location of a start sector for the at least one track and information indicating whether the at least one track contains a defective sector,
    wherein the start sector of a track that contains a defective sector is located next to the defective sector.

2. The apparatus of claim 1, wherein the start sector of a track that does not contain a defective sector is skewed behind the start sector of an adjacent outer track.

3. The apparatus of claim 1, wherein the start sector of a track that contains a plurality of defective sectors is located next to the defective sector having a maximum length along the track.

4. The apparatus of claim 1, wherein intervals from the servo areas to the start sectors of all tracks containing a primary defect are substantially equal to each other.

5. The apparatus of claim 1, further comprising a head moving module configured to control the head to skip at least one defective sector and to move to the start sector of an adjacent inner track on when the head reaches a defective sector.

6. An alignment method of a head configured to read and write information from and on a disc, the disc comprising a plurality of servo areas and a plurality of data areas, at least one data area comprising a plurality of tracks, at least one track comprising a plurality of data sectors, the method comprising:
    detecting a primary defect;
    identifying at least one defective sector based on the primary defect; and
    creating a format table comprising, for the at least one data area, information indicating the location of a start sector for the at least one track and information indicating whether the at least one track contains a defective sector,
    wherein the start sector of a track that contains a defective sector is located next to the defective sector.

7. The method of claim 6, wherein creating the format table comprises skewing the location of the start sector of a track that does not contain a defective sector behind the start sector of an adjacent outer track.

8. The method of claim 6, wherein creating the format table comprises setting the location of the start sector, of a track that contains a plurality of defective sectors, to be next to the defective sector having a maximum length along the track.

9. The method of claim 6, wherein intervals from the servo areas to the start sectors of all tracks containing a primary defect are substantially equal to each other in the format table.

10. An alignment method of a head configured to read and write information from and on a disc, the disc comprising a plurality of servo areas and a plurality of data areas, at least one data area comprising a plurality of tracks, at least one track comprising a plurality of data sectors, the method comprising:
    referring to a format table comprising, for the at least one data area, information indicating the location of a start sector for the at least one track and information indicating whether the at least one track contains a defective sector, wherein the start sector of a track that contains a defective sector is located next to the defective sector; and
    controlling a head to skip at least one defective sector and to move to a start sector of an adjacent inner track when the head reaches a defective sector.

* * * * *